(12) United States Patent  (10) Patent No.: US 9,056,624 B2
Velde  (45) Date of Patent: Jun. 16, 2015

(54) FRONT WHEEL DRIVE CONTROL

(71) Applicant: Deere & Company, Moline, IL (US)

(72) Inventor: Todd Velde, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 95 days.

(21) Appl. No.: 13/676,657

(22) Filed: Nov. 14, 2012

(65) Prior Publication Data

US 2014/0131122 A1  May 15, 2014

(51) Int. Cl.
*B62D 6/00* (2006.01)
*B62D 9/00* (2006.01)
*B62D 12/00* (2006.01)

(52) U.S. Cl.
CPC *B62D 9/002* (2013.01); *B62D 6/00* (2013.01); *B62D 12/00* (2013.01)

(58) Field of Classification Search
CPC .......... B62D 6/00; B62D 11/02; B62D 11/18; B62D 11/183; B62D 12/00; B62D 53/00; B62D 9/002
USPC .......... 180/6.2, 6.28, 6.3, 6.48, 6.5, 235, 242, 180/418
See application file for complete search history.

(56) References Cited

U.S. PATENT DOCUMENTS

| | | | |
|---|---|---|---|
| 4,186,618 A | 2/1980 | Richards | |
| 5,147,010 A | 9/1992 | Olson et al. | |
| 5,941,330 A | 8/1999 | Miller et al. | |
| 6,039,133 A * | 3/2000 | Zulu | 180/6.64 |
| 6,164,402 A * | 12/2000 | Hastreiter | 180/243 |
| 6,508,328 B1 * | 1/2003 | Kenyon et al. | 180/308 |
| 6,614,429 B1 | 9/2003 | Zhang et al. | |
| 6,631,320 B1 | 10/2003 | Holt et al. | |
| 6,857,494 B2 | 2/2005 | Kobayashi et al. | |
| 7,325,636 B2 | 2/2008 | Yeoman et al. | |
| 7,712,559 B2 | 5/2010 | Yeoman et al. | |
| 7,766,104 B2 * | 8/2010 | Newberry et al. | 180/24.09 |
| 7,891,182 B2 | 2/2011 | Kelly et al. | |
| 8,352,145 B2 * | 1/2013 | Uematsu et al. | 701/88 |
| 8,381,853 B2 * | 2/2013 | Iwaki et al. | 180/65.285 |
| 8,626,404 B2 | 1/2014 | Thomson et al. | |
| 2002/0027025 A1 | 3/2002 | Kobayashi et al. | |
| 2006/0042838 A1 * | 3/2006 | Yeoman et al. | 180/6.2 |
| 2006/0097683 A1 * | 5/2006 | Hosoda et al. | 318/568.12 |
| 2008/0091325 A1 * | 4/2008 | Yeoman et al. | 701/69 |
| 2008/0255735 A1 * | 10/2008 | Marathe et al. | 701/50 |
| 2009/0043439 A1 * | 2/2009 | Barfoot et al. | 701/25 |
| 2010/0161190 A1 * | 6/2010 | McCann et al. | 701/69 |
| 2011/0040460 A1 * | 2/2011 | Velde et al. | 701/50 |
| 2011/0155486 A1 * | 6/2011 | Iwaki et al. | 180/65.1 |
| 2011/0257861 A1 * | 10/2011 | Uematsu et al. | 701/88 |
| 2011/0270497 A1 * | 11/2011 | Uematsu et al. | 701/50 |
| 2012/0041651 A1 * | 2/2012 | Uematsu et al. | 701/50 |
| 2013/0013158 A1 | 1/2013 | Weber et al. | |
| 2013/0192919 A1 * | 8/2013 | Subrt et al. | 180/400 |
| 2014/0005899 A1 * | 1/2014 | Byers et al. | 701/50 |
| 2014/0131122 A1 | 5/2014 | Velde | |

OTHER PUBLICATIONS

Office Action for co-pending U.S. Appl. No. 13/676,388, dated Mar. 4, 2014 (32 pages).

* cited by examiner

*Primary Examiner* — Anne Marie Boehler
*Assistant Examiner* — Maurice Williams

(57) ABSTRACT

A front wheel power system which may enable independent control of power to each wheel as well as yield direct control over average and differential front wheel speeds.

10 Claims, 6 Drawing Sheets

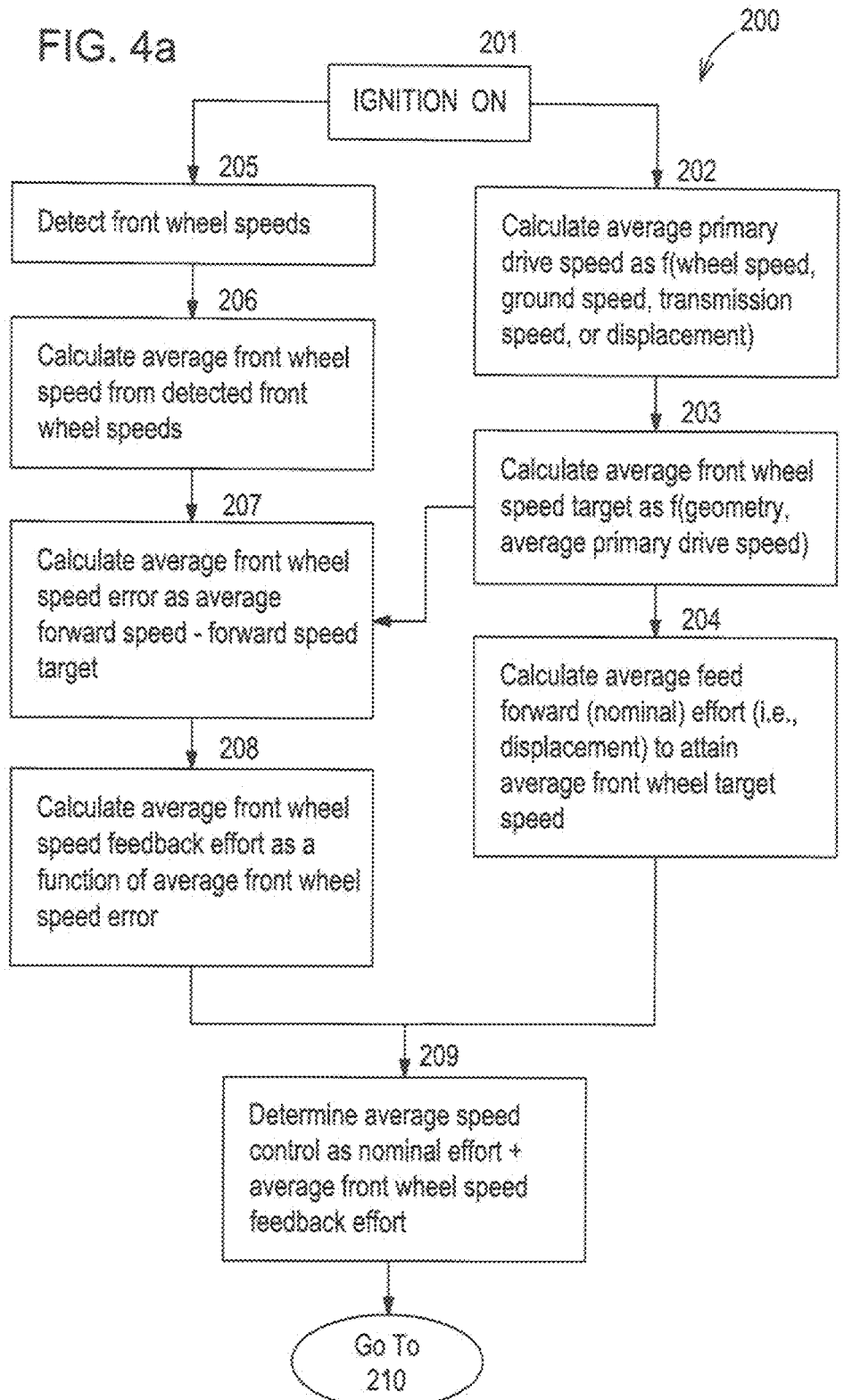

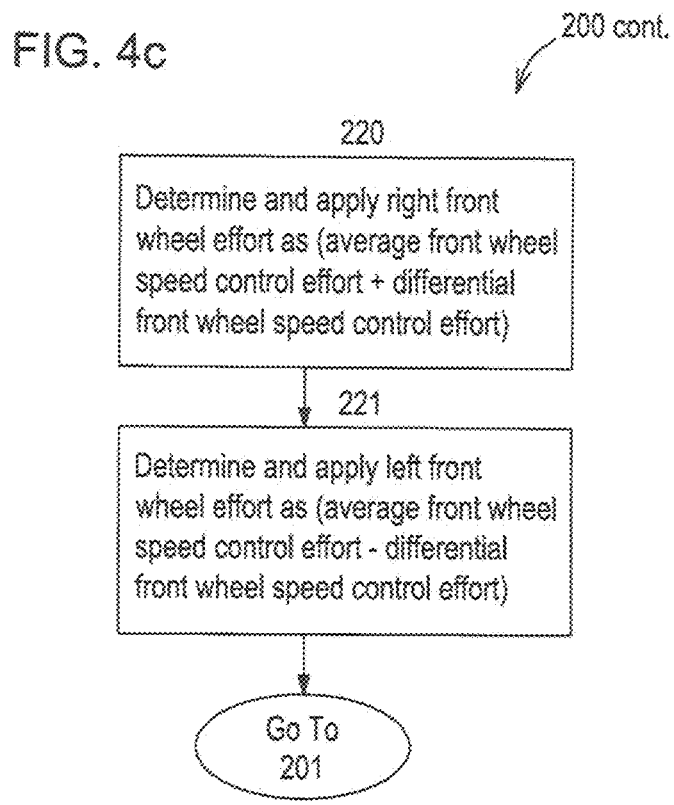

FRONT WHEEL DRIVE CONTROL

FIELD OF THE INVENTION

The disclosure relates to front wheel drives and, specifically, the control of front wheel drives on work vehicles such as motor graders.

BACKGROUND

Conventional work vehicles such as, for example, motor graders, include ail wheel drive capabilities with at least one motor for driving the front wheels and a transmission for transferring power from the engine or, perhaps an electric motor, to the rear wheels. During turns of the vehicle, the front wheels may travel in arcuate or circular paths and may, for the sake of vehicular efficiency as well as operating experience, be required to rotate at greater speeds than the rear wheels when the front wheels are of a diameter equal to that of the rear wheels as the front wheels may travel greater distances. Also, a front wheel on the outer radius of the turn (an outer wheel) may be required to rotate at a greater speed than that of a front wheel on the inner radius of the turn (an inner wheel) as the path of the outer wheel has a greater radius than the path the inner wheel travels.

Conventional work vehicles address these challenges with open differentials and variations of limited differential including: limited slip differentials; and differentials that are self locking, locked manually or locked via software at threshold differences between actual speeds and predicted speeds of left and right wheels (detection of slippage), etc. In efforts to address the obvious challenges presented by the arrangements noted above, some solutions monitor and independently control the rotational speeds of each of the front wheels at all times based on turning angles of the front wheels and, in the case of vehicles such as motor graders, the articulation angles of the vehicle. The latter solutions have various drawbacks that demand compromises.

SUMMARY

The inventors have recognized that the mere independent control of the speeds of each of the front wheels may not provide direct control over independent response characteristics for average and differential speeds. Such an approach includes two control loops; one for the right wheel and the other for the left front wheel. Thus, there is a tradeoff between acceleration and load acceptance smoothness on the one hand and steering and lateral traction on the other hand. The average speed of the front wheels, which is important for front wheel aggressiveness and slipping, is not controlled; it is a side effect of the loading and the control performance of the two loops. The differential speed of the two front wheels, which is important for steering performance, is not directly controlled; it is a side effect of the loading and the performance of the two speed loops.

The invention may directly address the challenges presented above by directly and independently controlling the average and differential response characteristics of the front wheels. The invention may also control response characteristics of the rear wheels to improve overall efficiency and operating experience.

BRIEF DESCRIPTION OF THE DRAWINGS

FIG. 4a illustrates an exemplary flowchart for average speed determination in the exemplary drive system of FIG. 2;

FIG. 4c illustrates an exemplary flowchart for determination of right and left front wheel efforts.

DETAILED DESCRIPTION

A description of exemplary embodiments of the invention will now be detailed. The same reference numbers will be used throughout the description as occasion allows.

Figure 1:
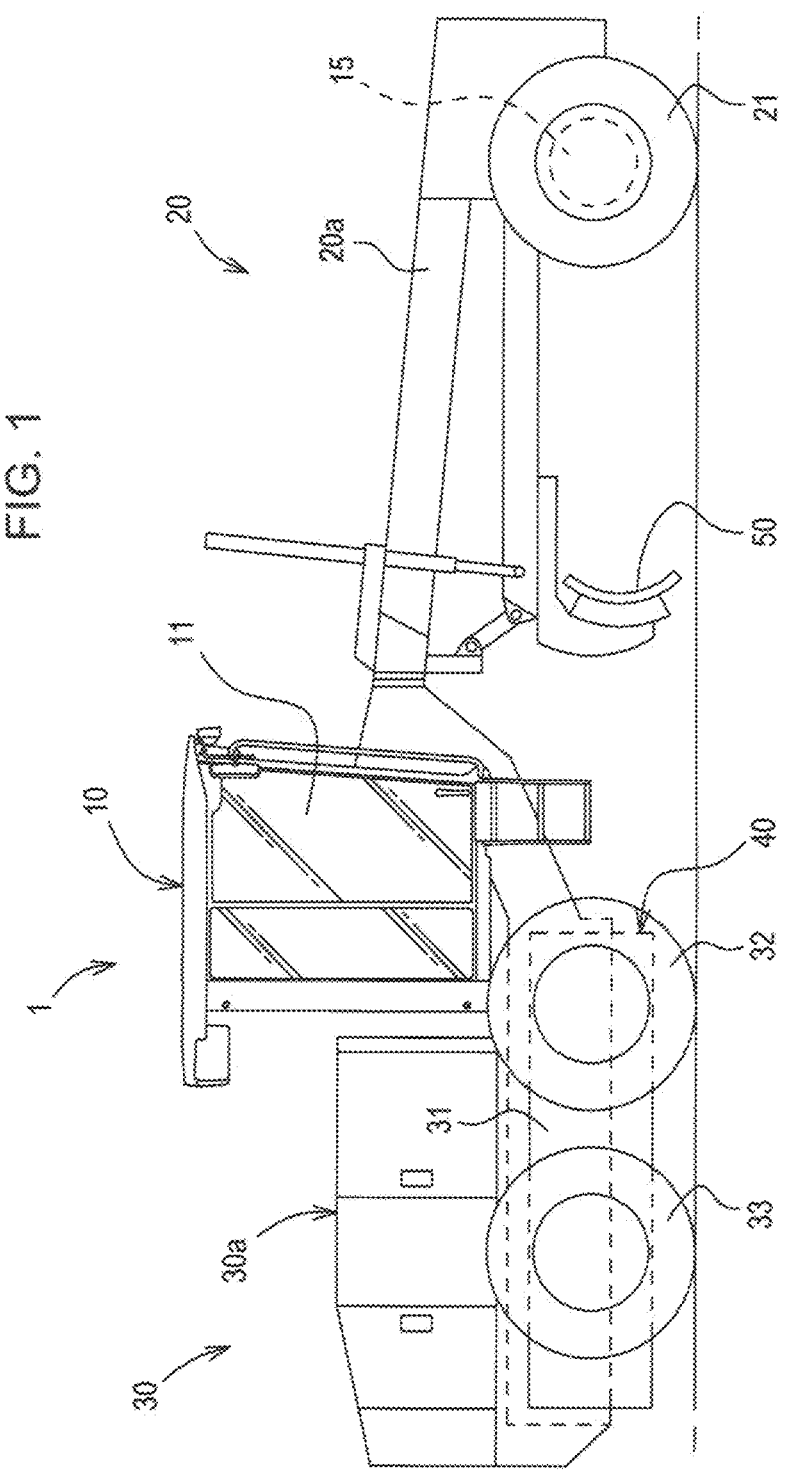
FIG. 1 illustrates an exemplary work vehicle utilizing the invention.

FIG. 1 illustrates an exemplary work vehicle, a motor grader 1, which could make use of the invention. The motor grader 1 of FIG. 1 may include: a cab 10 having a steering device 11 and a seat 12; a front portion 20 having a front frame 20a, a powered left front wheel 21, a powered right front wheel 22; a rear portion 30 including a rear frame 30a, tandem devices 31; rear wheels 32, 33; and an articulation mechanism 40 including an articulation joint 41 and an articulation cylinder 42 for angular adjustments between the front and rear portions 20, 30. Also included may be a tandem device 31 from which the rear wheels 32 receive motive power. The motor grader 1 may also include a work tool 50 for moving earth as the work vehicle 1 traverses the ground.

Figure 2:
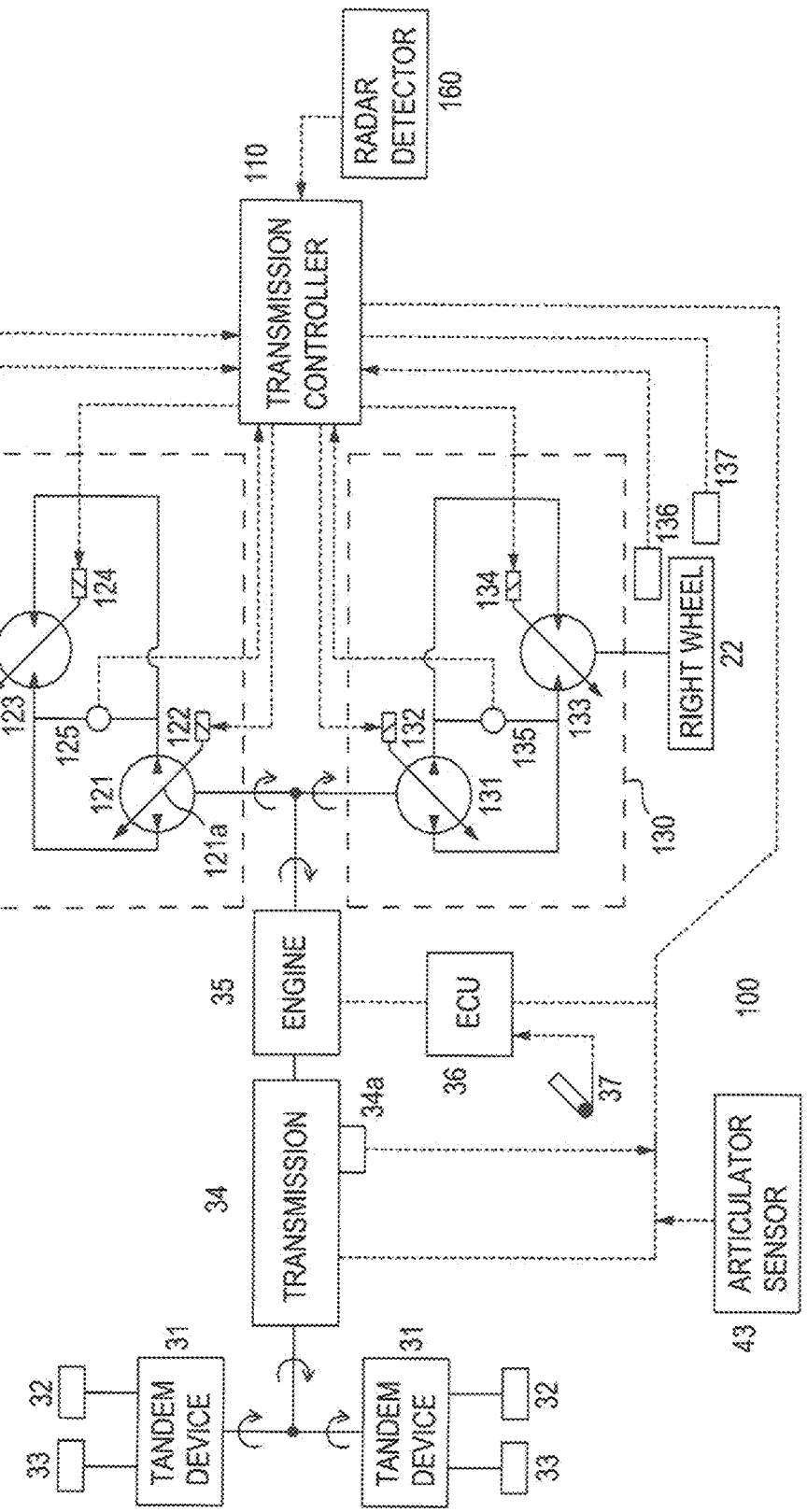
FIG. 2 illustrates a schematic of a first exemplary embodiment of the wheel drive control system to be utilized in the exemplary work vehicle of FIG. 1.

FIG. 2 represents a schematic of a first exemplary embodiment of the wheel drive control system 100 for the left and right front wheels 21, 22 and the rear wheels 32, 33 of the motor grader of FIG. 1. As illustrated, the drive system 100 may, among other things, include: tandem devices 31 through which the rear wheels 32, 33 may receive motive power; a transmission 34; a transmission controller 110 which may be in communication with, and operatively connected to: the transmission 34; a left hydrostatic transmission 120; and a right hydrostatic transmission 130. The transmission controller 110 may also be in communication with: an engine controller unit (ECU) 36; a left front wheel speed sensor 126; a left front wheel angle sensor 127; a right front wheel speed sensor 136; a right front wheel angle sensor 137; and a rear speed sensor 34a. An acceleration pedal 37 having a feature of detecting and communicating pedal positions may be in communication with the ECU 36. As illustrated in FIG. 2, a vehicle speed sensor such as, for example, radar detector 160 may also be available and in communication with the transmission controller 110.

As illustrated, the left hydrostatic transmission 120 may include: a left hydraulic pump 121 with variable displacement; a left pump solenoid 122 to position a left pump swash plate 121a; a left hydraulic motor 123; a left motor solenoid 124 for positioning a left motor swash plate 123a; and a left pressure sensor 125 for sensing a pressure difference between the left hydraulic pump 121 and the left hydraulic motor 123. The transmission controller 110 is in communication with the left pressure sensor 125 and operably connected to the left pump solenoid 122 and the left motor solenoid 124.

As with the left hydrostatic transmission 120, the right hydrostatic transmission 130 may include: a right hydraulic pump 131 with variable displacement; a right pump solenoid 132 to position a right pump swash plate 131a; a right hydraulic motor 133; a right motor solenoid 134 for positioning a right motor swash plate 133a; and a right pressure sensor 135 for sensing a pressure difference between the right hydraulic pump 131 and the right hydraulic motor 133. The transmission controller 110 is in communication with the right pressure sensor 135 and operably connected to the right pump solenoid 132 and the right motor solenoid 134.

As illustrated, the left and right hydrostatic transmissions 120, 130 may be mechanically connected to the engine 35. They may also be mechanically connected to left and right front wheels 20, 30 respectively.

Figure 3:
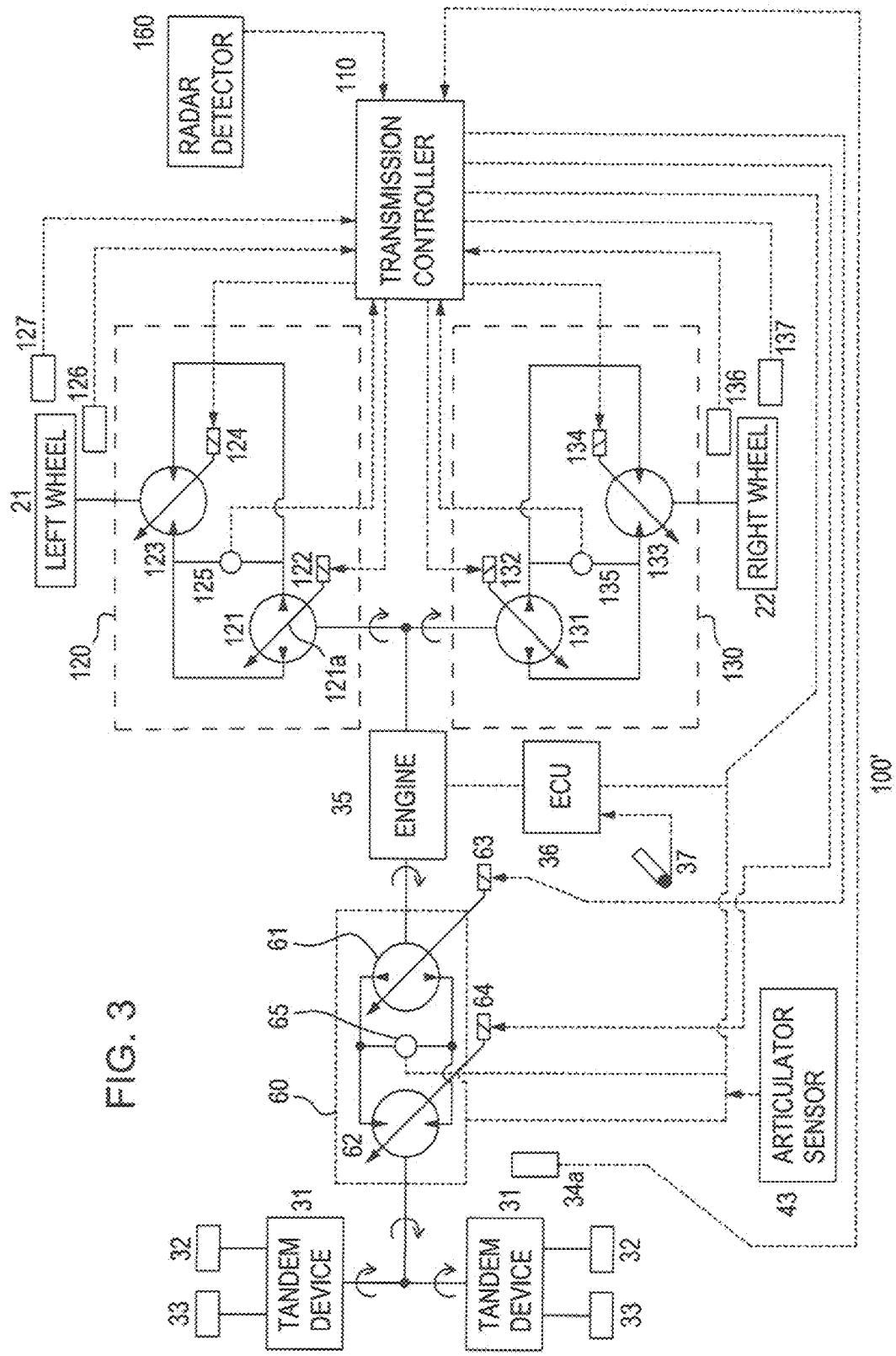
FIG. 3 illustrates a schematic of a second exemplary embodiment of the wheel drive control system.

FIG. 3 illustrates a schematic of a second exemplary embodiment of the wheel drive control system 100'. The differences between the first and second exemplary embodiments of the invention 100, 100' may be attributed to rear transmission differences. The second exemplary embodiment of the wheel drive control system 100' employs a rear hydrostatic transmission 60 in the stead of the geared transmission 34 of the first exemplary embodiment of the wheel drive control system 100. As with the left and right hydrostatic transmissions 120, 130 at the front of the work vehicle 1, the transmission controller 110 may control the swash plates 61a, 62a of the respective pump and motor 61, 62 via operable connections to the respective pump and motor solenoids 63, 64. Swash plate displacement may determine the average speed of the rear wheels 32, 33.

Figure 4B:
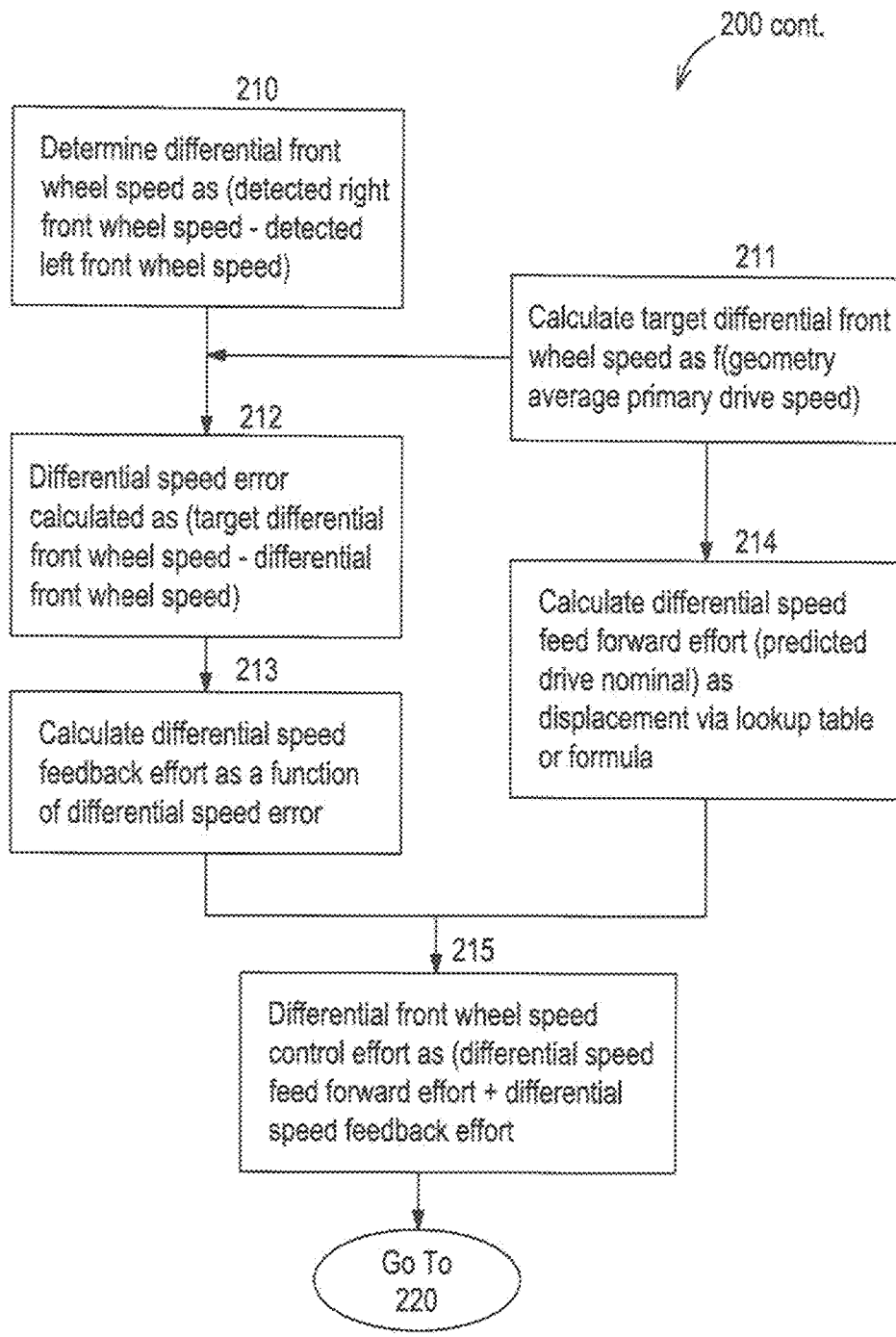
FIG. 4b illustrates an exemplary flowchart for differential speed determination in the exemplary drive system of FIG. 2.

FIGS. 4a, 4b and 4c illustrate an exemplary flowchart 200 for determining average and differential front wheel speed control efforts for the exemplary drive systems 100, 100' of FIGS. 2 and 3 and detailing the actions of the transmission controller 110 with respect to the transmissions 34, 60, the rear speed sensors 34a, 66, the left front wheel speed sensor 126, the left front wheel angle sensor 127, the right front wheel speed sensor 136, the right front wheel angle sensor 137, the articulation angle sensor 43, the operator input device 140 and, possibly, a vehicle speed detector separate from the power train of the motor grader 1 such as, for example, the radar speed detector 160.

As illustrated in FIG. 4a, the average front wheel speed control effort (ASCE) may be viewed as a function of nominal and feedback efforts. As illustrated, the drive system 100 is activated when the ignition is on and front wheel assist is turned on at step 201. At step 202, the controller 110 may determine an average primary drive speed as a function of detected rear speed via a rotational speed detector (such as, for example, rear speed detector 34a, rear speed detector 66 or the like); a detected vehicle ground speed via radar detector 160; or an anticipated speed via cross referencing rear speeds with displacements at the pump 61 and the motor 62. The average front wheel speed target (ATS) may then be calculated, at step 203, based upon primary drive average speed and the vehicle model (i.e., for example, a detected articulation angle, a detected steering angle, a length between the articulation joint 41 and the front wheels 21, 22 and a length between the articulation joint 41 and the rear wheels 32, 33). At step 204, the average front wheel speed target (ATS) from step 203 may then be used to calculate a nominal (or feed forward) average front wheel speed control effort (NAE). In exemplary embodiments, the front wheels 21, 22 are driven by hydrostatic transmissions 120, 130 respectively. In such a case effort may be considered as a function of displacement. Thus, the NAE may be determined via the use of a lookup table cross referencing front wheel speeds with displacements for swash plates 121a and 131a or via equivalent formulae. Note that a displacement, especially a change in displacement, at hydrostatic transmission 60 may, under some circumstances, be considered to be an acceleration as the wheels 32, 33 may require a finite time to respond to the displacement with a speed adjustment.

As illustrated, at step 206, the average front wheel speed (AMS) may be determined from the speeds of the front wheels 21, 22 which may be detected by the left and right speed sensors 126, 136 at step 205. The average front wheel speed error (ASE) may then be calculated at step 207 as a function of average front wheel speed as calculated at step 206 and front wheel average speed target as calculated at step 205 (e.g., ATS minus AMS). At step 208, an average front wheel speed feedback effort (AFE) may be calculated as a function of ASE. At step 200 the average speed control effort may be calculated as the nominal feed forward front wheel speed effort plus the front wheel speed feedback effort (e.g., NAE plus AFE).

Illustrated in FIG. 4b is a similar pattern used by the controller 110 to determine the associated differential front wheel speed control effort (DSCE). At step 210, the controller 110 may determine differential front wheel speed (DFS) as detected right front wheel speed minus detected left front wheel speed. At step 211, the controller 110 may calculate a target differential front wheel speed TDS as a function of average primary drive speed, and a vehicle model which may include: positions of the rear wheels 32, 33 with respect to the articulation joint 41; positions of the front wheels 21, 22 with respect to the articulation joint 41; the diameters of the front wheels 21, 22; the diameters of the rear wheels 32, 33; the detected articulation angle Aa; and a turning angle Ta of the front wheels 21, 22. The average primary drive speed may, among other things, be based upon a detected rotational speed via the rear speed sensor 34a or the detected ground speed of the vehicle 1 via a speed detector independent of rotational speeds such as, for example, the radar speed detector 160. If the vehicle has a hydrostatic transmission 60, the average primary drive speed may be determined with detected displacements at the hydrostatic transmission 60 via a lookup table or formula effectively cross referencing displacements and average primary drive speeds. At step 212, the controller 110 may calculate the front wheel differential speed error (DSE) as a function of the detected differential front wheel speed (DFS) and the target differential front wheel speed (TDS), i.e., (DSE=TDS−DFS, and DFE=f(DSE)). At step 213, the DFE is determined by cross referencing the DSE value with displacements in an appropriate lookup table or a suitable formula. At step 214, the predicted or nominal front wheel differential speed feed forward effort (NDE) may be determined by using the TDS to find a corresponding displacement via a lookup table or formula cross referencing displacements and wheel speeds. Finally, at step 215, the differential speed control effort (DSCE) may be calculated as the sum of the nominal differential speed feed forward effort and the differential speed feedback effort, i.e., DSCE=NDE+DFE.

As illustrated in FIG. 4c, at step 220 the controller 110 may determine right front wheel speed control effort (RSCE) as a function of average front wheel speed control effort (ASCE) and DSCE (e.g., RSCE=ASCE+DSCE). At step 221, the left front wheel speed control effort (LSCE) may also be determined as a function of ASCE and DSCE (e.g., LSCE=ASCE−DSCE). The controller 110 may then send appropriate commands to control the speeds of the front wheels 21, 22, i.e., signals controlling swash plate positions for the hydraulic pumps 121, 131 and motors 123, 133 of front wheels 21, 22, and return to step 201.

An operator input device 170 may be used to communicate aggressiveness settings, i.e., settings of front wheel efforts and front wheel target speeds as a percentage or multiple of rear speeds detected via rear speed detector 34a or vehicle speed via, for example, the radar speed detector 160 and, thus control of aggressiveness by the transmission controller 110.

The exemplary drive system 100 may also allow control over torque windup by monitoring torque values at the left and right front wheels 21, 22. In hydrostatic drives, hydrostatic or hydraulic pressure may be considered as proportional to torque. The transmission controller 110 may monitor torque values by monitoring the pressure signals from the left and right pressure sensors 125, 135 and determining the respective torques via an appropriate equation or a lookup table. The transmission controller 110 may then control windup by controlling the left and right hydrostatic transmissions 120, 130 such that the differences between the calculated left and right torques stay within a predetermined range.

Having described the exemplary embodiment, it will become apparent that various modifications can be made without departing from the scope of the invention as defined in the accompanying claims.

The invention claimed is:

1. A drive system for a vehicle, comprising;
   a front portion, including a front frame, a first front wheel and a second front wheel, a first front wheel speed sensor for detecting a speed of the first front wheel, a second front wheel speed sensor for detecting a speed of the second front wheel, a wheel angle sensor for detecting a turning angle of the first and second front wheels, and a first and second power system for independently powering the first and second front wheels;
   a rear portion, including a rear frame, rear wheels, a rear speed sensor for detecting a speed of the rear wheels, and a third power system for powering the rear wheels, the front frame pivotally connected to the rear frame;
   an articulation angle sensor for detecting a connection angle between the front and rear frames;
   an operator input device for detecting a demand on the drive system by the operator;
   a controller in communication with the operator input device, the articulation angle sensor, the wheel angle sensor, the first front wheel speed sensor, the second front wheel speed sensor and the rear wheel speed sensor, the controller operatively connected to the first power system and the second power system, the controller independently determining an average front wheel speed control effort based on at least in part a target average speed for the first and second wheels and a detected average speed of the first and second wheels, the controller independently determining a differential front wheel speed control effort based on at least in part a target differential front wheel speed and a detected differential front wheel speed, and the controller applying the average front wheel speed control effort and the differential front wheel speed control effort to the first and second front wheels;
   wherein the controller determines the average front wheel speed control effort and the differential front wheel speed control effort in separate control loops.

2. The drive system of claim 1, wherein the first front wheel travels a first distance and the second front wheel travels a second distance greater than the first distance.

3. The drive system of claim 1, further including an operator control for adjusting aggressiveness for the front wheels, wherein the average front wheel speed control effort is at least partially based on an aggressiveness adjustment.

4. The drive system of claim 1, further including a vehicle speed sensor for determining a speed of the vehicle, wherein the average front wheel speed control effort is at least partially based on the speed determined.

5. The drive system of claim 1, wherein the average front wheel speed control effort is at least partially based on the demand detected by the operator input device.

6. The drive system of claim 1, wherein the average front wheel speed control effort is at least partially based on a detected speed of the rear wheels.

7. The drive system of claim 1, wherein each of the first and second power systems includes an electric motor.

8. The drive system of claim 1 wherein each of the first and second power systems includes a hydraulic motor.

9. The drive system of claim 1, wherein the average front wheel speed control effort is based on an average feedback effort and an average feed forward effort and the differential front wheel speed control effort is based on a differential feedback effort and a differential feed forward effort.

10. The drive system of claim 9, wherein the controller applies to the first front wheel the average front wheel speed control effort plus the differential front wheel speed control effort and the controller applies to the second front wheel the average front wheel speed control effort minus the differential front wheel speed control effort.

* * * * *